(12) United States Patent
Kitano et al.

(10) Patent No.: US 6,623,591 B2
(45) Date of Patent: Sep. 23, 2003

(54) OPTICAL DISC AND METHOD OF MANUFACTURING THE SAME

(75) Inventors: Ryoko Kitano, Tokushima-ken (JP); Kaname Yamada, Tokushima-ken (JP); Takafumi Sakamoto, Tokushima-ken (JP)

(73) Assignee: Kitano Engineering Co, Ltd., Tokushima-ken (JP)

( * ) Notice: Subject to any disclaimer, the term of this patent is extended or adjusted under 35 U.S.C. 154(b) by 70 days.

(21) Appl. No.: 09/865,728

(22) Filed: May 29, 2001

(65) Prior Publication Data

US 2001/0053123 A1 Dec. 20, 2001

(30) Foreign Application Priority Data

May 30, 2000 (JP) ........................................ 2000-161296

(51) Int. Cl.[7] .............................................. B29C 47/00
(52) U.S. Cl. ...................... 156/245; 264/1.33
(58) Field of Search ................... 156/245, 74, 80, 156/150, 275.5, 275.7, 498; 369/286; 264/1.33, 1.7, 1.9, 328.8, 237, 348; 428/64.4; 198/952; 62/378, 380, 382

(56) References Cited

U.S. PATENT DOCUMENTS

| | | | | |
|---|---|---|---|---|
| 5,458,821 A | * | 10/1995 | Shimazu et al. | 264/2.2 |
| 5,833,902 A | * | 11/1998 | Coxhead et al. | 264/106 |
| 6,103,039 A | * | 8/2000 | Paulus et al. | 156/223 |
| 6,416,609 B1 | * | 7/2002 | Imada et al. | 156/245 |

* cited by examiner

*Primary Examiner*—Michael W. Ball
*Assistant Examiner*—John L. Goff
(74) *Attorney, Agent, or Firm*—Sughrue Mion, PLLC (57) ABSTRACT

The invention intends to provide a method of manufacturing an optical disc capable of efficiently manufacturing a high quality optical disc by a consecutive product line, and to improve productivity in an injection molding step. The method is constituted by bonding two disc halves wherein a first disc half storing information therein and molded by a mold of a first injection molding unit and second disc half storing information therein, which information is different from that stored in the first disc half, and molded by a mold of a second injection molding unit are paired with and bonded to each other.

3 Claims, 8 Drawing Sheets

OPTICAL DISC AND METHOD OF MANUFACTURING THE SAME

BACKGROUND OF THE INVENTION

1. Field of the Invention

The invention relates to an optical disc such as a DVD the like, and a method of manufacturing the optical disc, particularly to a method of manufacturing an optical disc which is placed in the in-line row.

2. Related Art

An optical disc, for example, a DVD is normally constituted by bonding two pieces of disc halves, namely, a first disc half and a second disc half.

These disc halves are generally molded by an injection molding unit (injection molding machine).

An optical reflection film or protection film is formed on a substrate serving as a disc half by a sputtering technique, and finally a first disc half and a second disc half are bonded to each other to manufacture a DVD.

A technique for manufacturing a DVD by a consecutive product line, particularly by in-line has not been conventionally completed. Accordingly, a DVD manufactured conventionally does not possess sufficient uniformity of quality. Further, the manufacture of a DVD requires different steps such as an injection molding step, a Cooling step, a sputtering step, a binding step and the like, each of which are respectively different in operation. As a result, the number of steps increases indispensably. Accordingly, there occurs loss in time, and hence a DVD is not manufactured efficiently.

Further, for a DVD comprising a pair of disc halves, there is one type that stores information in one disc half and another type that stores information in both disc halves. In the latter case, in an injection molding step of the foregoing steps, a mold used in the injection molding step is provided with different stampers that are attached to the inner walls thereof for storing different information in the same mold. This is done because two disc halves storing different information therein are normally manufactured at the same time (see, e.g., Japanese Patent Paid-Open Publication No. 9-155986).

However, if these stampers are assembled in the same mold, it is difficult to discriminate them from each other, and hence confusion results. Further, when the disc halves serving as molded products are taken out from the mold using a production take-out unit, the disc halves storing therein different information are taken out while discriminating them from each other, which leads to confusion. Still further, if the disc halves are transferred to a subsequent step, for example, a cooling step, they have to be once separated from the same mold, and are transferred by a line, leading to the increase of the number of steps. Under the circumstances, there is a problem in that a conventional bonding unit eventually results in an increased manufacturing cost.

SUMMARY OF THE INVENTION

In view of the foregoing problems, it is an object of the invention to provide a method of manufacturing an optical disc capable of manufacturing a high quality optical disc by a consecutive product line with high efficiency. It is another object of the invention to improve a productivity in an injection molding step.

Inventors of this application endeavored themselves to study the foregoing problems and completed the invention based on the finding the provision of a buffering step for stocking disc halves of an optical disc in the product line, and the molding of a pair of disc halves by different molds in an injection molding step, thereby consecutively and efficiently manufacturing an optical disc.

That is, a first aspect of the invention relates to a method of manufacturing an optical disc constituted by bonding two disc halves wherein a first disc half storing information therein and molded by a mold of a first injection molding unit and a second disc half storing information therein, which information is different from that stored in the first disc half, and molded by a mold of a second injection molding unit are paired and bonded to each other.

A second aspect of the invention relates to a method of manufacturing an optical disc constituted by bonding two disc halves comprising at least a step of molding a first disc half storing information therein by a mold of a first injection molding unit and a step of molding a second disc half storing information therein, which information is different from that stored in the first disc half, by a mold of a second injection molding unit.

A third aspect of the invention relates to a method of manufacturing an optical disc wherein the mold of the first injection molding unit and the mold of the second injection molding unit are formed of respectively a multicavity mold.

A fourth aspect of the invention relates to a method of manufacturing an optical disc wherein a plurality of stampers provided in the mold of the first injection molding unit are the same and a plurality of stampers provided in the mold of the second injection molding unit are the same.

A fifth aspect of the invention relates to a method of manufacturing an optical disc constituted by bonding two disc halves comprising an injection molding step for molding a first disc half storing information therein by a mold of a first injection molding unit and molding a second disc half storing information therein, which information is different from that stored in the first disc half, by a mold of second injection molding unit, a cooling step for cooling the disc halves after the injection molding step, a sputtering step for forming reflection films on disc halves after the cooling step, a buffering step for stocking the disc halves after the sputtering step, and a bonding step for bonding the two disc halves and integrating them after the buffering step.

A sixth aspect of the invention relates to a method of manufacturing an optical disc wherein a cooling unit used in the cooling step is disposed between first and second injection molding units used in the injection molding step.

A seventh aspect of the invention relates to a method of manufacturing an optical disc wherein the first disc half molded by the mold of the first injection molding unit and the second disc half molded by the mold of the second injection molding unit are separated from each other after the injection molding step, and transferred to the cooling step.

An eighth aspect of the invention relates to an optical disc manufactured by either of the first to seventh aspects of the invention.

It is possible to employ a construction combined at least two aspects of the invention selected from the first to seventh aspects of the invention if it meets the object of the invention.

According to the invention, an optical disc can be continuously and efficiently manufactured by a consecutive product line without always stopping the flow of a work (disc halves) by arranging the cooling step after the injection molding step, the sputtering step after the cooling step, the buffering step after the sputtering step, and the bonding step after the buffering step.

Further, it is possible to achieve efficiency of the injection molding step by pairing and bonding two disc halfs comprising the first disc half storing therein information and molded by the mold of the first injection molding unit and the second disc half storing therein information, which information is different from that stored in the first disc half, and molded by the mold of the second injection molding unit.

PREFERRED EMBODIMENT OF THE INVENTION

A method of manufacturing an optical disc according to a preferred embodiment is now described with reference to the attached drawings.

Figure 1:
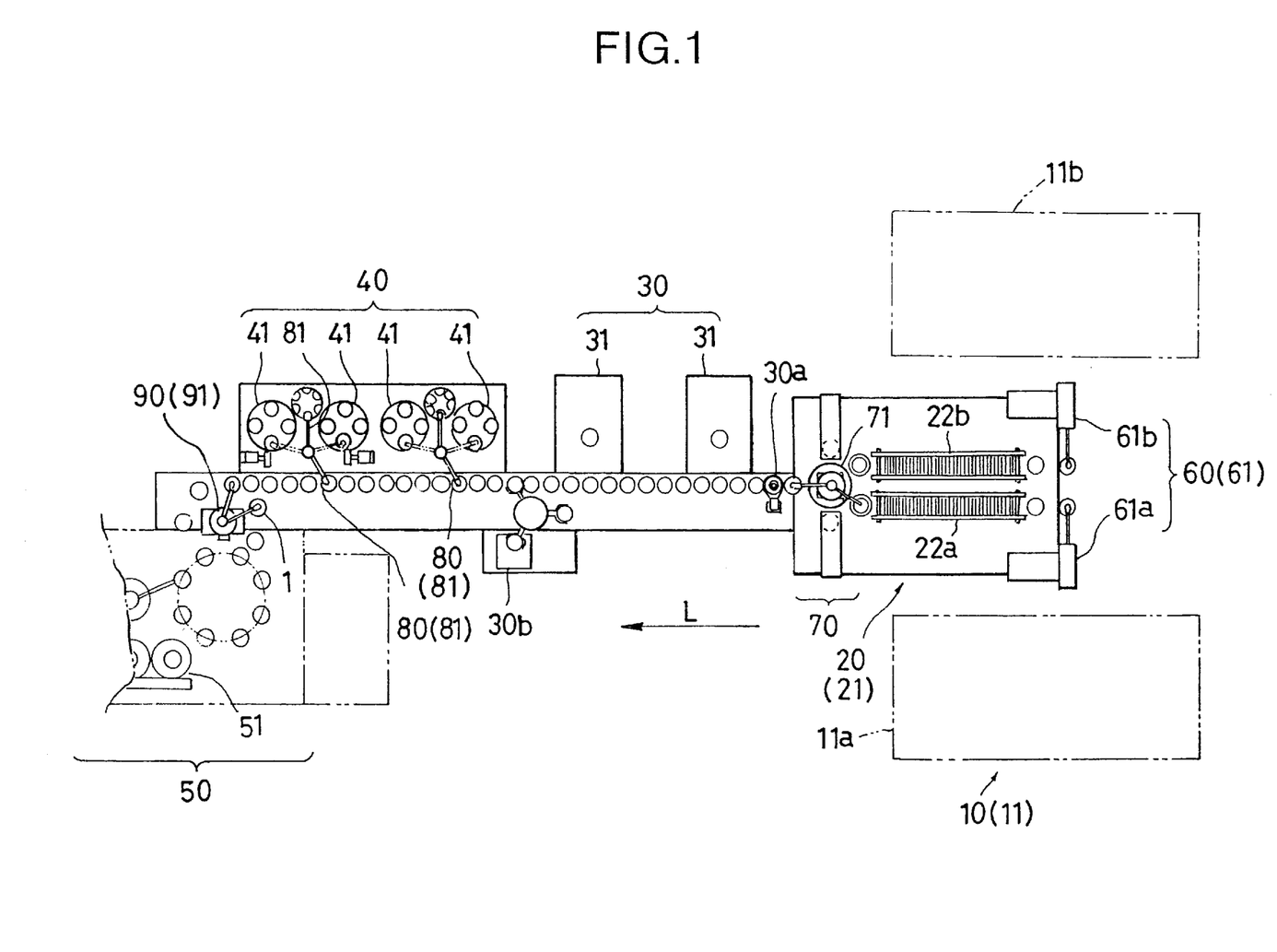
FIG. 1 is a view showing an example of the arrangement of each step in a method of manufacturing an optical disc according to the invention.

FIG. 1 is a view showing an example of the arrangement of each step of a method of manufacturing an optical disc according to the invention.

Although an optical device is constituted by bonding two pieces of disc halves, the method comprises an injection molding step 10 for injecting and molding a disc half, a cooling step 20 following the injection molding step 10, a sputtering step 30 following the cooling step 20, a buffering step 40 following the sputtering step 30, and a bonding step 50 following the buffering step 40. These steps are arranged along a product line L.

It is preferable to appropriately provide a static elimination cleaning step 30a or inspecting step 30b at a starting point and an ending point of the sputtering step 30, if need be.

Along the optical disc product line L of an optical disc, described later, each work transfer step is provided between the respective steps. Accordingly, a work (disc half) can be delivered in an optimum posture conforming to each step while the position of the work is changed when the work is transferred from a pre-step to a post-step, and the posture of the work is also changed, if need be.

Figure 2:
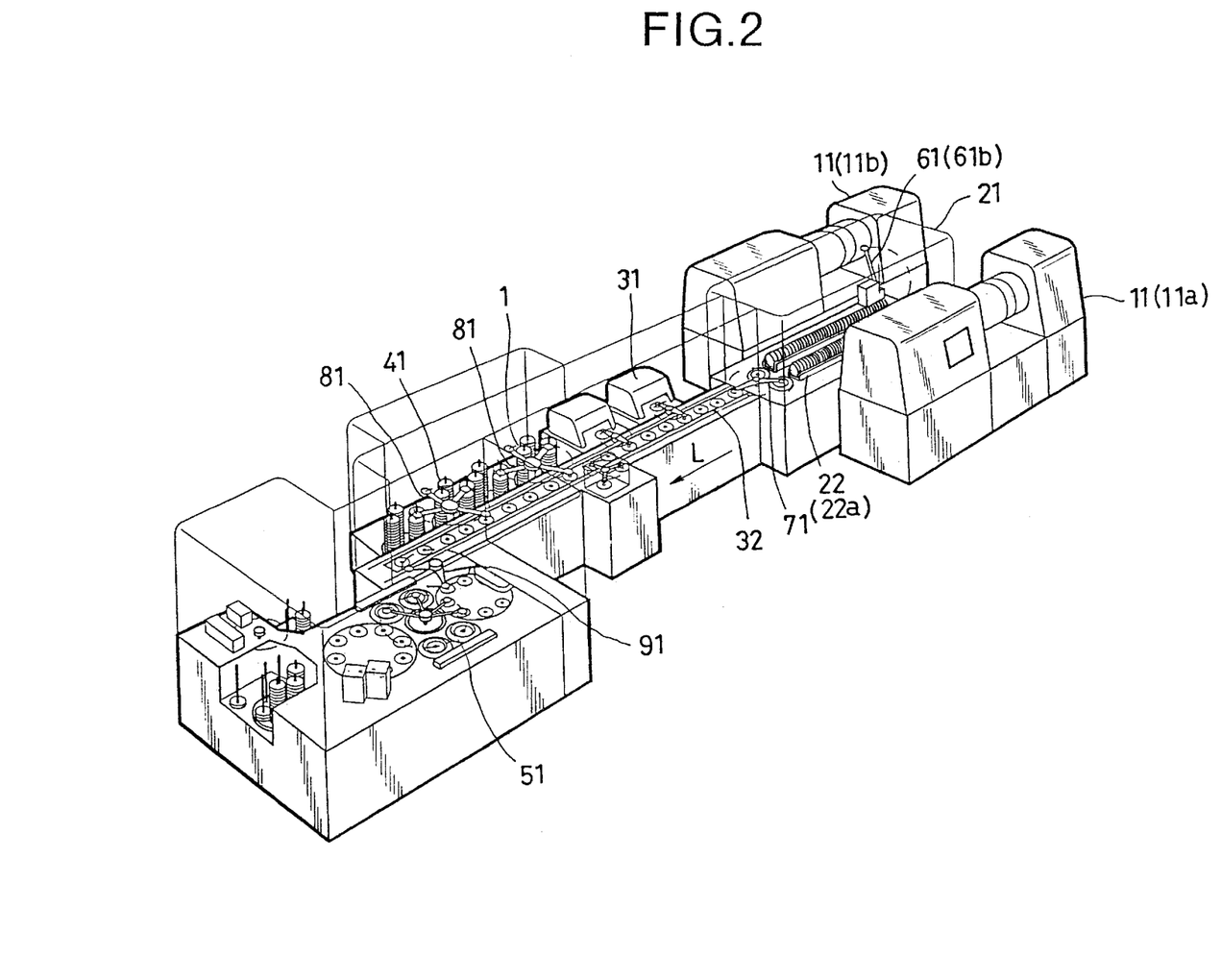
FIG. 2 is a perspective view showing an example of the schematic construction of a manufacturing unit used in carrying out the method of the invention.

FIG. 2 is a perspective view showing an example of the schematic construction of a manufacturing unit used in carrying out the method of the invention.

In FIG. 2, a manufacturing apparatus comprises an injection molding unit 11 for carrying out the injection molding step 10, a cooling unit 21 for carrying out the cooling step 20, a sputtering unit 31 for carrying out the sputtering step 30, a buffer unit for carrying out the buffering step 40, namely, a work stocker 41, and a bonding unit 51 for carrying out the bonding step 50.

In the injection molding step 10, a half substrate which is a half of the optical disc, namely, each disc half is molded by two injection molding units, namely, a first injection molding unit 11a and a second injection molding unit 11b which are disposed in a space. Suppose that a first disc half and a second disc half may be molded by the first injection molding unit 11a and the second injection molding unit 11b.

Figure 3:
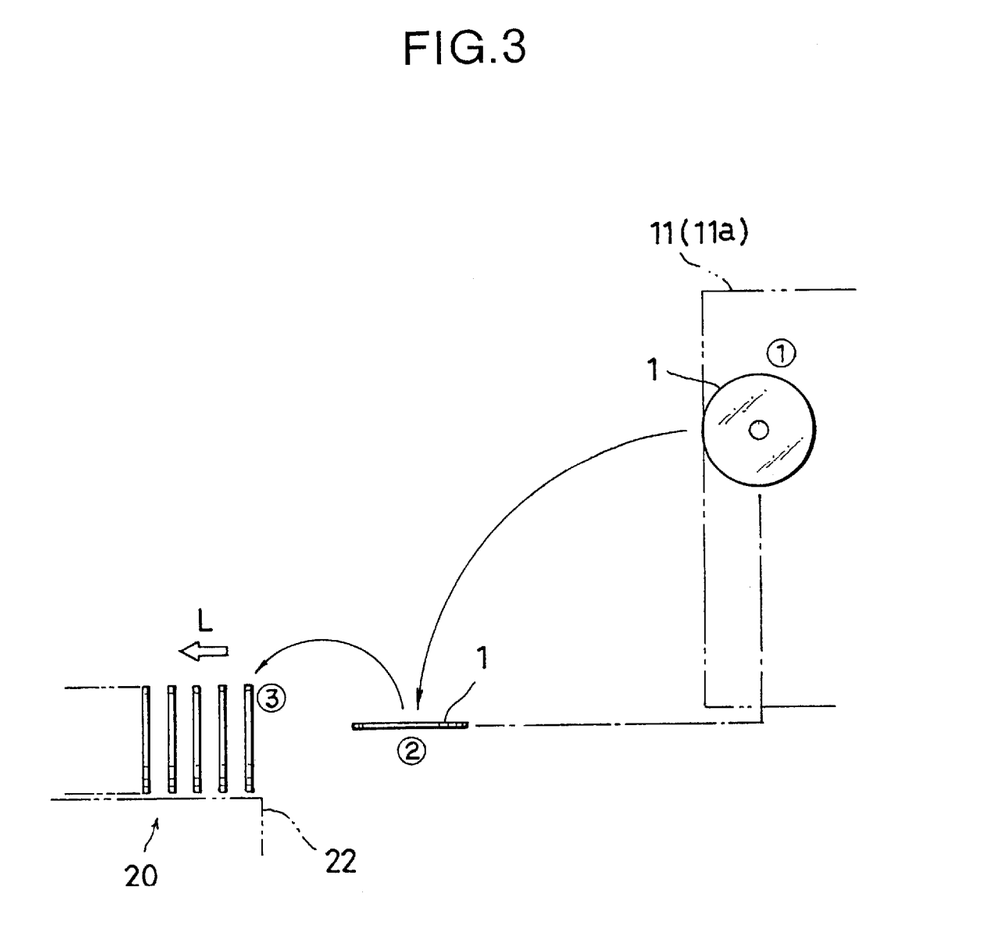
FIG. 3 is a view typically representing a work transfer step between an injection molding step and a cooling step according to the invention.

In the injection molding step 10, as shown in FIG. 3, each molded disc half 1 is taken out by product take-out unit, not shown, and is held by a member at the periphery of a mold of the first injection molding unit 11a or a mold of the second injection molding unit 11b at a given position while it is knocked out in a vertical posture.

Figure 8:
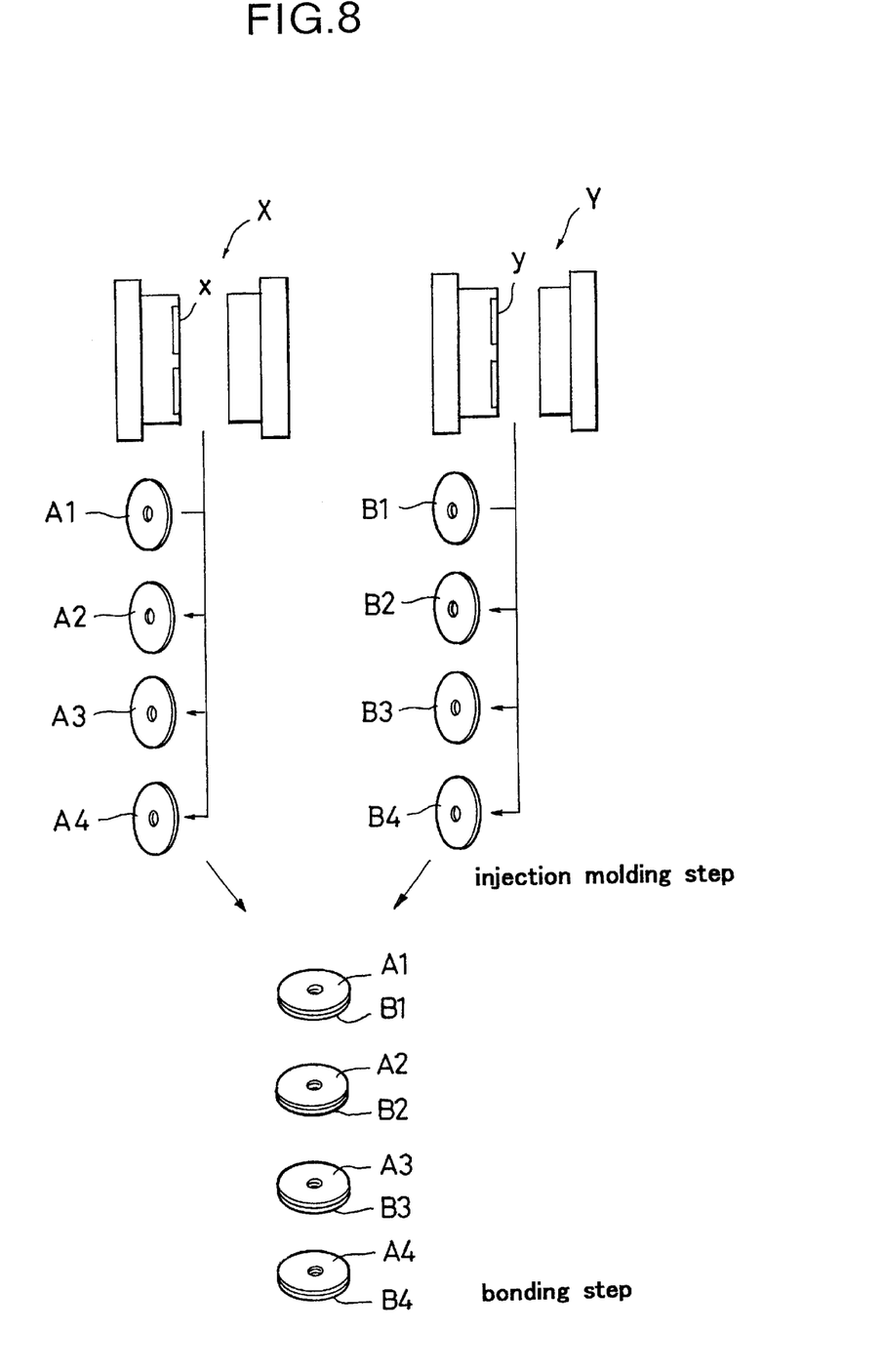
FIG. 8 is a view typically representing a relationship between molds of injection molding units and disc halves molded thereby according to the invention.

FIG. 8 is a view typically representing a relationship between molds of injection molding units and disc halves molded thereby according to the invention.

A mold X of the first injection molding unit 11a has a plurality of stampers x (they are attached to an innerwall of the mold X in a normal manner) each storing the same information so that a plurality of the same first disc halves (A1 to A4) are molded. On the other hand, a mold Y of the second injection molding unit 11b has a plurality of stampers y each storing the same information so that a plurality of the same second disc halves (B1 to B4) are molded.

Since a plurality of the same stampers x and y are respectively attached to the mold X of the first injection molding unit 11a and the mold Y of the second injection molding unit 11b, it is not necessary to discriminate the stampers from each other when the stampers are attached to the mold so that the assembling operation can be remarkably simplified.

Since the mold X of the first injection molding unit 11a and the mold Y of the second injection molding unit 11b are located at different positions, no confusion occurs when taking out the first disc halves and second disc halves using a product take-out unit. Further, the motion of the take-out unit is simplified.

Further, the disc halves taken out from the mold X and mold Y in the injection molding step 10 can be easily transferred to the subsequent steps along the product line L while they are discriminated from each other. Accordingly, the injection molding step 10 can be carried out with high efficiency and a method of manufacturing an optical disc can be carried out with high efficiency.

In the last bonding step, the disc halves which were transferred along the product line L while they were discriminated from each other are respectively paired and bonded to each other, namely, a pair of disc halves A1 and B1, disc halves A2 and B2, disc halves A3 and B3, and disc halves A4 and B4 are paired and bonded to each other.

There is a work transfer step 60 between the injection molding step 10 and the cooling step 20. There is provided the cooling unit 21 for carrying out the cooling step 20 and it is provided with a cooling conveyor 22.

In the work transfer step 60, as shown in FIG. 3, each disc half 1 molded by the injection molding unit 11 in a vertical posture ① is taken out by a work transfer unit 61 and it is once held thereby in a horizontal posture ②. Each disc half 1 in the horizontal posture ② is transferred to the cooling conveyor 22 in the cooling step 20 in a vertical posture ③. With such handling of each disc half 1 at two stages, each disc half 1 can be smoothly delivered from the injection molding step 10 to the cooling step 20 via the work transfer step 60.

The cooling conveyor 22 comprises a first cooling conveyor 22a and a second cooling conveyor 22b corresponding to the first injection molding unit 11a and the second injection molding unit 11b as shown in FIG. 1.

The work transfer unit 61 comprises a first work transfer unit 61a and a second work transfer unit 61b corresponding to the first cooling conveyor 22a and the second cooling conveyor 22b.

The first cooling conveyor 22a and the second cooling conveyor 22b move forward while they stand up each disc halve.

In the cooling step 20, the cooling unit 21 is used for carrying out the cooling step 20. The cooling unit 21 has an air conditioner chamber which surrounds the cooling unit 21 and it is preferable that the air conditioner chamber is transparent because the interior of the air conditioner chamber can be visually inspected. In the air conditioner chamber, a plurality of disc halves placed on the cooling conveyor 22 (comprising first cooling conveyor 22a and the second cooling conveyor 22b) can be cooled at a given temperature (e.g., 20 to 23° C.). Each disc half 1 transferred by the cooling conveyor 22 is cooled to have a given temperature when it stays in the air conditioner chamber for a given period of time.

Figure 4:
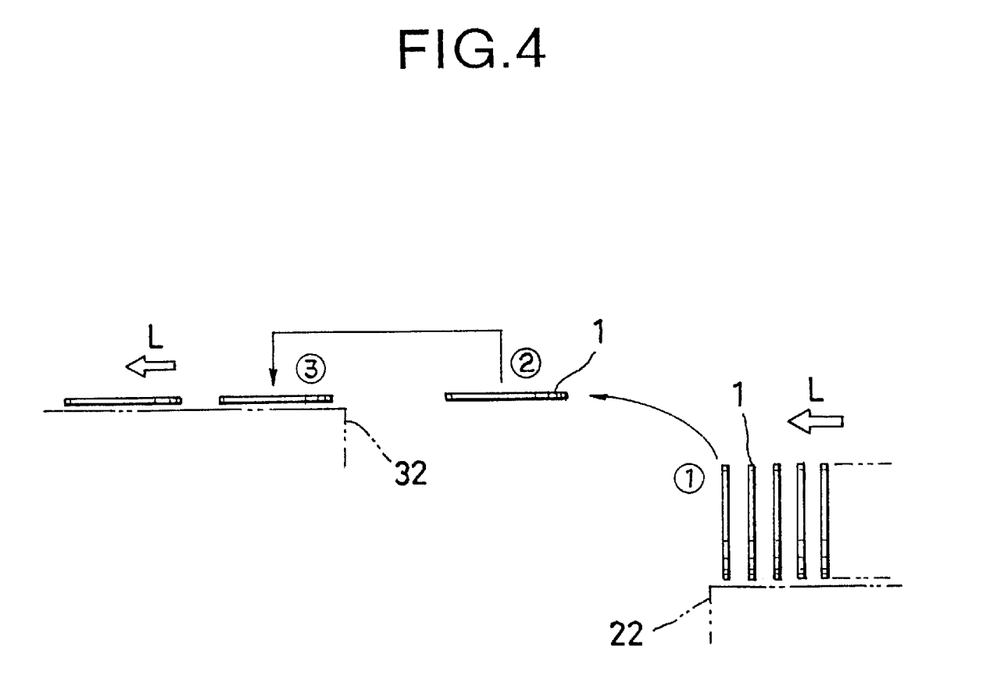
FIG. 4 is a view typically representing a work transfer step between the cooling step and a sputtering step according to the invention.

There is a work transfer step 70 between the cooling step 20 and the sputtering step 30. In the work transfer step 70, each disc half 1 placed on the cooling conveyor 22 in the vertical posture ① is once held in the horizontal posture ② by a work transfer unit 71 for carrying out the work transfer step 70 as shown in FIG. 4. Each disc half 1 in the horizontal posture ② is transferred to a transfer conveyor 32 in the horizontal posture ③.

With such handling of each disc half 1 at two stages, each disc half 1 can be also smoothly delivered.

Subsequently, in the sputtering step 30, the sputtering unit 31 for carrying out the sputtering step 30 takes therein each disc half 1 placed on the transfer conveyor 32 and forms a reflection film or a protection film on each disc half 1.

Figure 5:
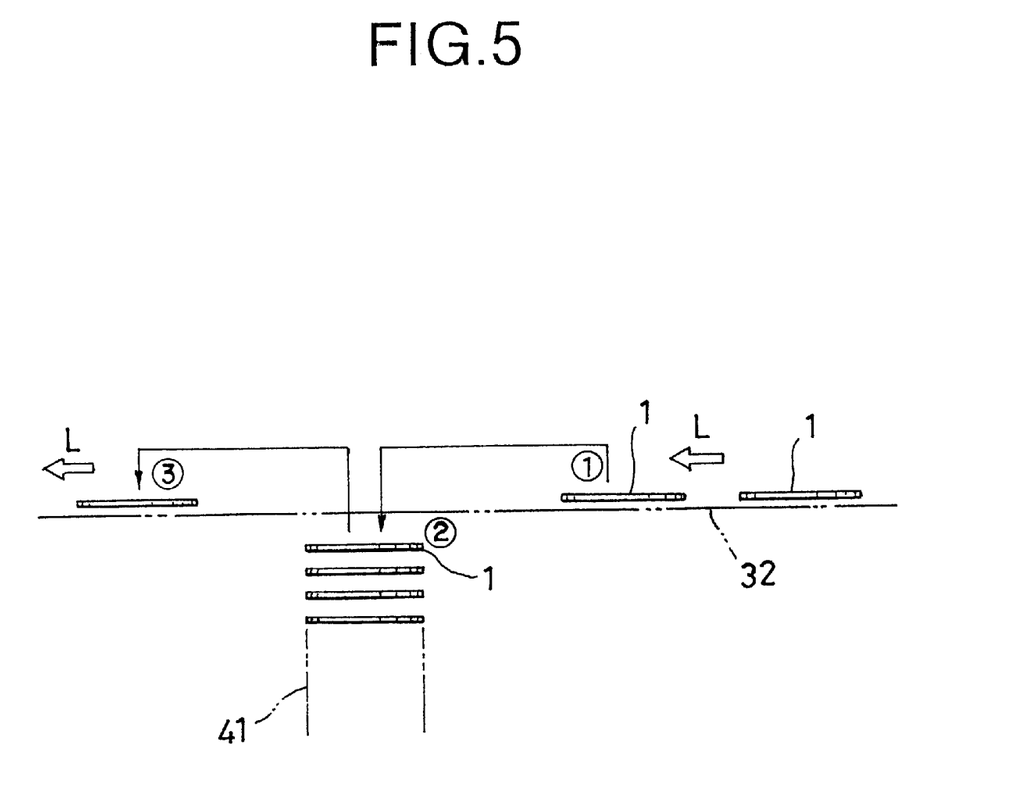
FIG. 5 is a view typically representing a work transfer step between the sputtering step and a buffering step according to the invention.

The buffering step 40 follows the sputtering step 30. There is a work transfer step 80 between the sputtering step 30 and the buffering step 40. The buffer unit, namely, the work stocker 41 carries out the buffering step 40 and can stock therein many disc halves 1. Each disc half 1 placed on the transfer conveyor 32 in the horizontal posture ① is once transferred to the work stocker 41 in the horizontal posture ② by a work transfer unit 81 for carrying out the work transfer step 80 as shown in FIG. 5. The work transfer unit 81 re-transfers each disc half 1 stocked in the work stocker 41 to the transfer conveyor 32 in the horizontal posture ③ upon elapse of a given period of time.

The work stocker comprises four work stockers 41 for carrying out the buffering step 40. Each of the work stockers 41 can stock each disc half 1 and hold it in a stacked state at a quarter circle, namely at a position obtained by dividing a circumference by four. The work stocker 41 sequentially stocks the disc halves transferred from the sputtering step 30 that is a pre-step of the buffering step 40. Each disc half 1 is supplied to the bonding step 50 which is a post-step of the buffering step 40 after it was stocked by the work stocker 41 for a given hours.

There is a work transfer step 90 between the buffering step 40 and the bonding step 50. In the work transfer step 90, each disc half 1 placed on the transfer conveyor 32 in a horizontal posture is transferred to the bonding unit 51 in the horizontal posture by a work transfer unit 91 for carrying out the work transfer step 90.

Figure 6:
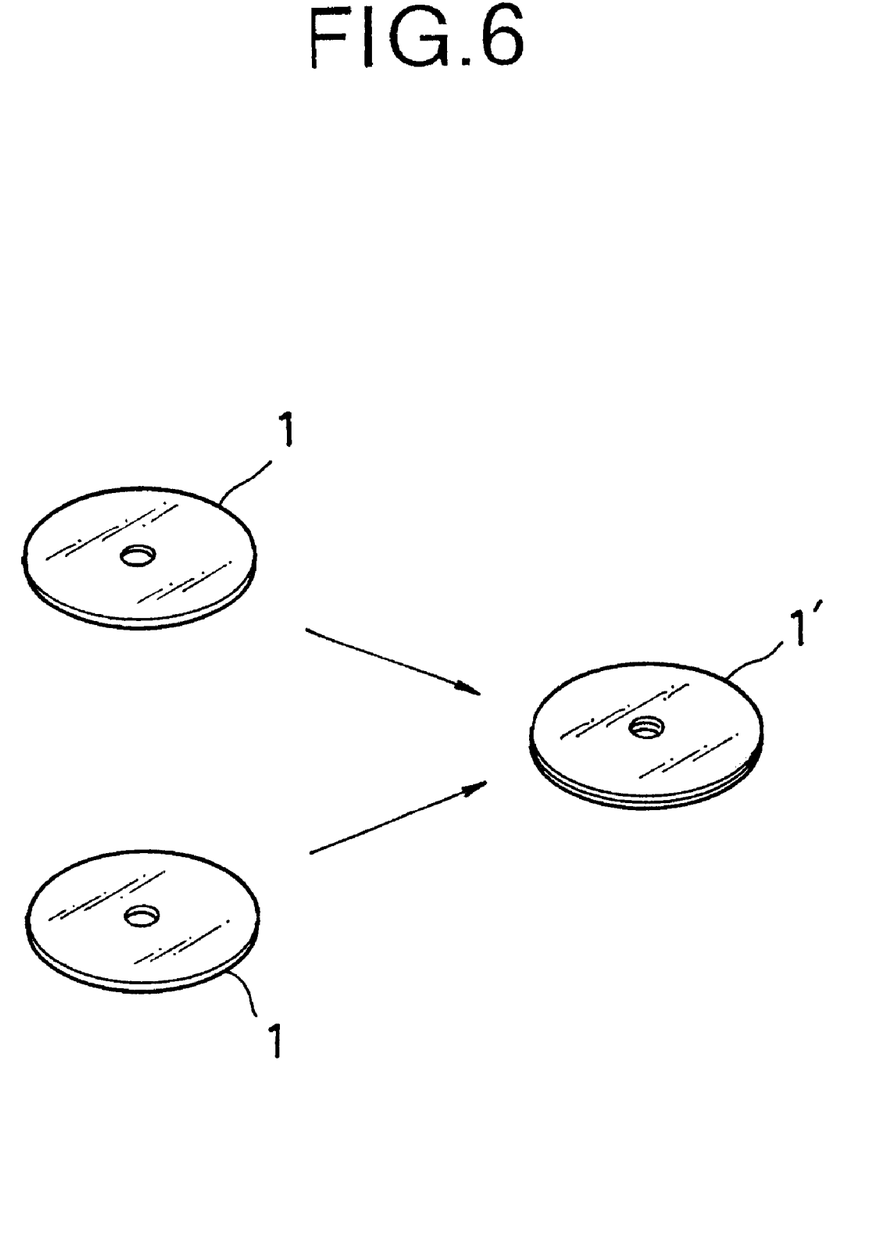
FIG. 6 is a view typically representing a bonding step according to the invention.

In the bonding step 50, the bonding unit 51 is used for carrying out the bonding step 50 and as shown in FIG. 6, it bonds two disc halves 1 (upper half substrate and lower half substrate) and integrate them. The bonding unit 51 applies a UV curing resin serving as an adhesive on the surface of one disc half (lower half substrate), and places another disc half (upper half substrate) on one disc half, then rotate both disc halves to develop the UV curing resin on one disc half. Thereafter, the UV curing resin is irradiated with UV to cure the UV curing resin to bond both disc halves. The inventors of this application have filed the application for the inventions describing detailed technique in this respect. As a result, two disc halves (upper and lower half substrates) are integrated with each other to accomplish a DVD optical disc 1'.

According to the manufacturing method of the invention, the DVD optical disc 1' can be efficiently manufactured by a consecutive product line by connecting each manufacturing step by the inline.

Figure 7:
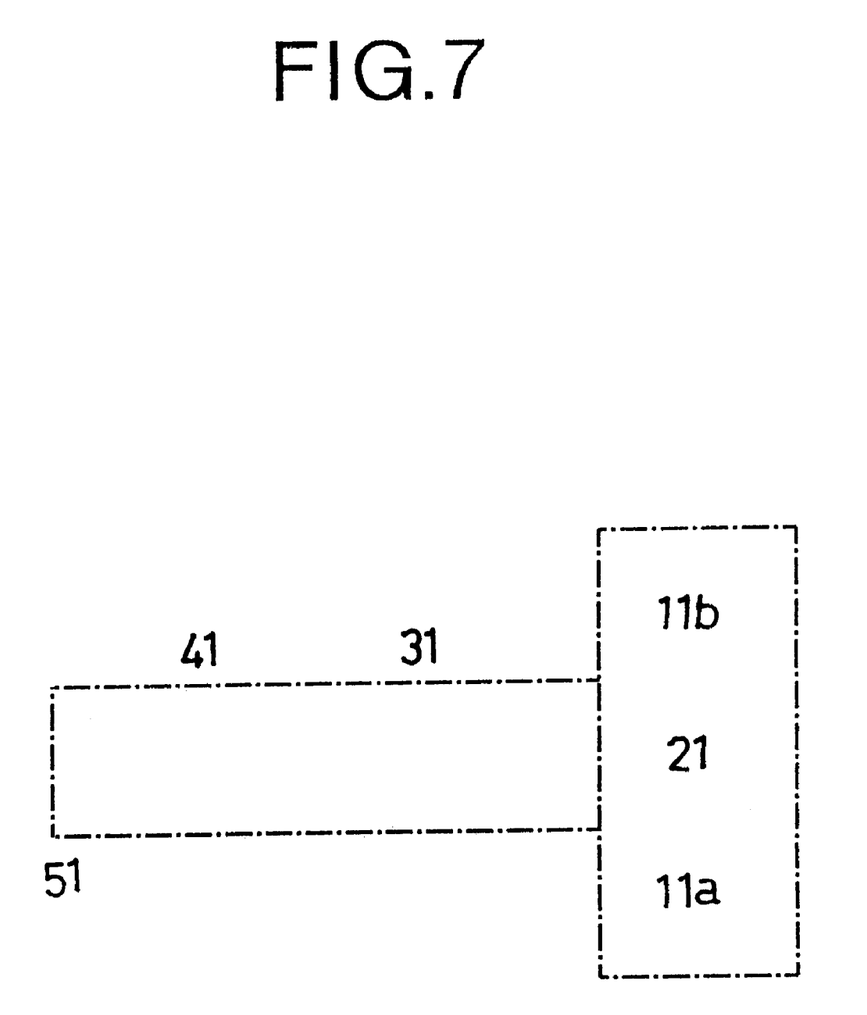
FIG. 7 is a view typically representing a T-shaped arrangement according to the invention.

Further, these units are arranged in a T-shape as a whole shown in FIG. 7, namely, the first injection molding unit 11a, the second injection molding unit 11b for carrying out the injection molding step 10 are arranged at both sides of the cooling unit 21 for carrying out the cooling step 20, and the sputtering unit 31 for carrying out the sputtering step 30 following the cooling step 20, the work stocker 41 for carrying out the buffering step 40 following the sputtering step 30 and the bonding unit 51 for carrying out the bonding step 50 are arranged in front of (left side in FIG. 7) the first injection molding unit 11a, the second injection molding unit 11b and cooling unit 21 which stand side by side. As a result, it is possible to view from the position of the cooling unit 21 the first injection molding unit 11a, the second injection molding unit 11b positioned at both sides thereof and the sputtering unit 31, work stocker 41, and bonding unit 51 positioned in front of thereof, and hence entire steps can be easily operated and controlled.

Since the first disc half storing information therein is molded by the mold of the first injection molding unit 11a and the second disc half storing information therein, which information is different from that in the first disc half, is molded by the mold of the second injection molding unit 11b, there does not occur confusion when the first and second disc halves are taken out by the product take-out unit. The disc halves are easily transferred to the steps following the injection molding step 10 while they are discriminated from each other.

Since the buffering step 40 is provided, even if any trouble and the like occurs in either step of pre-steps, disc halves 1 stocked in the work stocker 41 can be supplied to the bonding step 50, and the troubled portion of any unit can be repaired while the disc halves 1 are supplied to the bonding step 50, so that a normal product line can be restored. Since the method has the buffering step, even if any trouble occurs to any unit, it is possible to always assure consecutive flow of the product line, thereby securing high productivity as a whole unit.

Even if there occurs a trouble in any unit in the bonding step 50 following the buffering step 40, the disc halves 1 at the steps after the sputtering step 30 are temporarily stocked in the work stocker 41 during the repair of the trouble, and hence the line transfer is not interrupted as a whole. Accordingly, a high availability can be secured.

Further, since the cooling unit 21 for carrying out the cooling step 20 are disposed between the first injection molding unit 11a and the second injection molding unit 11b for carrying out the injection molding step 10, each disc half 1 can be transferred from the first injection molding unit 11a and the second injection molding unit 11b to the cooling unit 21 within minimum distance and it can be efficiently cooled.

If a cooling source is arranged between the first injection molding unit 11a and the second injection molding unit 11b, it becomes the same environment as the cooling unit 21, thereby suppressing the increase of a room temperature caused by the heat from the injection molding unit 11.

Although the invention has been described with reference to the preferred embodiment, it is not limited to this preferred embodiment, and hence it is needless to say that it can be variously modified without departing from the essence of the invention.

For example, although the first and second halves are moved on the same line except during the cooling step, they may be moved on the different lines. Since the first and second disc halves are molded from the different molds, they may be moved on the different lines with much ease.

Further, although a product line of the preferred embodiment is explained as an in-line product line, the invention can be applied to an off-line product line. In this case, each disc half 1 after the sputtering step is cooled, for example, for about 24 hours in the work stocker 41, then it is supplied to the bonding step 50.

As mentioned in detail above, according to the invention, an optical disc such as a DVD can be manufactured continuously and efficiently by a consecutive product line. Further, a high productivity in the injection molding step can be achieved. As a result, a high quality optical disc can be provided, achieving a substantially low manufacturing cost.

What is claimed is:

1. A method of manufacturing an optical disc constituted by bonding two disc halves comprising:
   an injection molding step for molding a first disc half storing information therein by a mold of a first injection molding unit and molding a second disc half storing information therein, which information is different from that stored in the first disc half by a mold of a second injection molding unit,
   a cooling step for cooling the disc halves after the injection molding step,
   a sputtering step for forming reflection films on the disc halves after the cooling step,
   a buffering step for stocking the disc halves after the sputtering step, and
   a bonding step for bonding the two disc halves to form an integrated optical disc after the buffering step;
   wherein the first disc half molded by the mold of the first injection molding unit and the second disc half molded by the mold of the second injection molding unit are separately transferred between said injection molding step and the cooling step;
   wherein the cooling step is performed by a cooling unit having conveyors disposed between the first and second injection molding units used in the injection molding step; and
   wherein, in the cooling step, the first disc half and the second disc half are placed vertically on separate cooling conveyors and those first and second disc halves are cooled while they are transferred.

2. The method of manufacturing an optical disc according to claim 1, wherein the mold of the first injection molding unit and the mold of the second injection molding unit are each a multicavity mold.

3. The method of manufacturing an optical disc according to claim 1 wherein a plurality of stampers provided in the mold of the first injection molding unit are the same.

* * * * *